(12) United States Patent
Matsumoto et al.

(10) Patent No.: US 7,599,106 B2
(45) Date of Patent: Oct. 6, 2009

(54) OPTICAL MASK AND MOPA LASER APPARATUS INCLUDING THE SAME

(75) Inventors: Osamu Matsumoto, Hamamatsu (JP); Toshiyuki Kawashima, Hamamatsu (JP); Tadashi Kanabe, Takarazuka (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 763 days.

(21) Appl. No.: 10/992,218

(22) Filed: Nov. 19, 2004

(65) Prior Publication Data
US 2005/0111514 A1    May 26, 2005

(30) Foreign Application Priority Data
Nov. 21, 2003    (JP) ............... P2003-392695

(51) Int. Cl.
*G02B 27/58*    (2006.01)
*H01S 3/08*    (2006.01)
*G02B 27/46*    (2006.01)

(52) U.S. Cl. ............... 359/227; 359/563; 359/569; 359/571; 372/103

(58) Field of Classification Search ............... 216/2, 216/12; 359/563, 569, 571, 227; 372/103
See application file for complete search history.

(56) References Cited

U.S. PATENT DOCUMENTS

| | | | | |
|---|---|---|---|---|
| 3,582,984 A | * | 6/1971 | Kurokawa | 348/291 |
| 4,842,969 A | * | 6/1989 | Kawatsuki et al. | 430/5 |
| 5,122,903 A | * | 6/1992 | Aoyama et al. | 359/565 |
| 5,130,857 A | * | 7/1992 | Gupta et al. | 359/563 |
| 5,428,478 A | * | 6/1995 | Hanyu et al. | 359/565 |
| 5,999,319 A | * | 12/1999 | Castracane | 359/573 |
| 2001/0021546 A1 | * | 9/2001 | Suwa | 438/200 |

OTHER PUBLICATIONS

Bontoux et al. "Study of Serrated Aperture for a Cassegrain Booster Amplifier", Optical Review vol. 5, No. 4 (1998), pp. 234-241.*
Annual Progress Report 2002 Institute of Laser Engineering Osaka University.
Serrated-aperture apodizers for high-energy laser systems Jerome M. Auerbach, Victor P. Karpenko: Applied Optics, vol. 33 Issue 15 p. 3179 (May 1994).
Beamlet Pulse-Generation and Wavefront-Control System B.M. Van Wonterghem, J.T. Salmon, R.W. Wilcox: UCRL-LR-105821-95-1, Lawrence Livermore National Laboratory, Livermore, CA, (1995).

* cited by examiner

*Primary Examiner*—Eric Bolda
(74) *Attorney, Agent, or Firm*—Drinker Biddle & Reath LLP (57) ABSTRACT

The present invention relates to an optical mask at low cost and so on having a structure capable of reducing further a peak of beam intensity caused by diffraction. The optical mask is constructed by overlapping a first mask and a second mask. The first mask and second mask each are a serrated aperture mask. The schematic shapes of the respective apertures of the first mask and second mask are almost rectangular and identical to each other. The fringe defining the aperture of the first mask is machined in a serrated shape, and the fringe defining the aperture of the second mask also is machined in a serrated shape. In the optical mask, the first mask and second mask are overlapped so that the serrations of the fringes defining the respective apertures of the first mask and second mask are located alternately.

8 Claims, 14 Drawing Sheets

OPTICAL MASK AND MOPA LASER APPARATUS INCLUDING THE SAME

BACKGROUND OF THE INVENTION

1. Field of the Invention

The present invention relates to an optical mask that shapes a spatial pattern of beam intensity, and an MOPA (Master Oscillator Power Amplifier) laser apparatus including that optical mask.

2. Related Background Art

Figure 9:
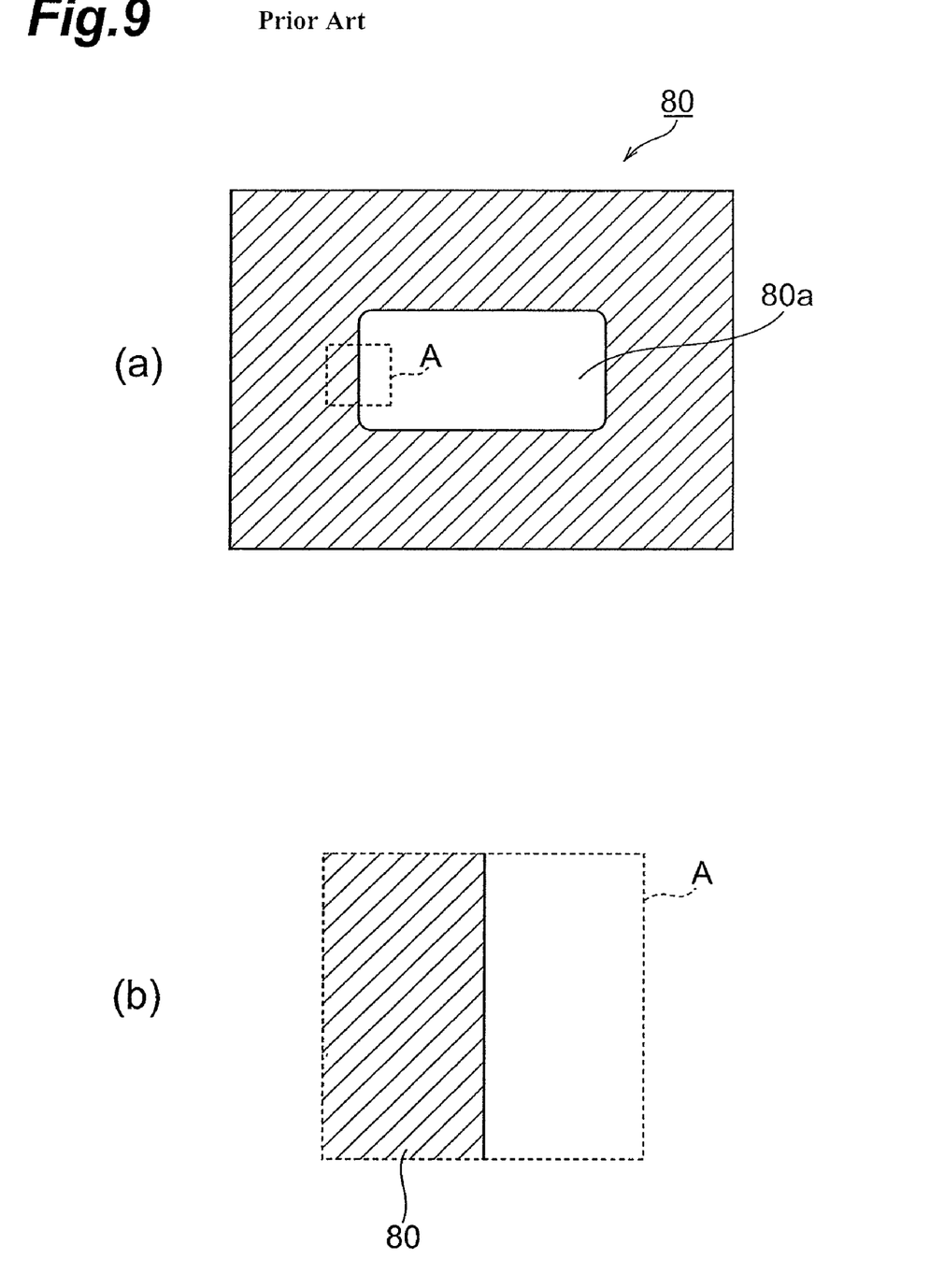
FIG. 9 is a view for explaining a structure of a hard aperture mask.

A hard aperture mask is known as an optical mask that shapes a spatial pattern of beam intensity. In the drawings, the area (a) in FIG. 9 shows a whole view of the hard aperture mask, and the area (b) in FIG. 9 is an enlarged view of section A. The hard aperture mask 80 has an aperture 80a having the same figure (substantially rectangular in an example as depicted) as that of the spatial pattern. In this figure, a hatching area represents a beam shielding section. And, the hard aperture mask 80 transmits through only this aperture 80a, and shields unnecessary beam, thereby shaping the spatial distribution of the laser beam to the same shape as the aperture shape. However, since in such a hard aperture mask mask the diffraction with edge defining the aperture is large, it is hard to obtain a desired spatial distribution of the beam intensity.

Figure 10:
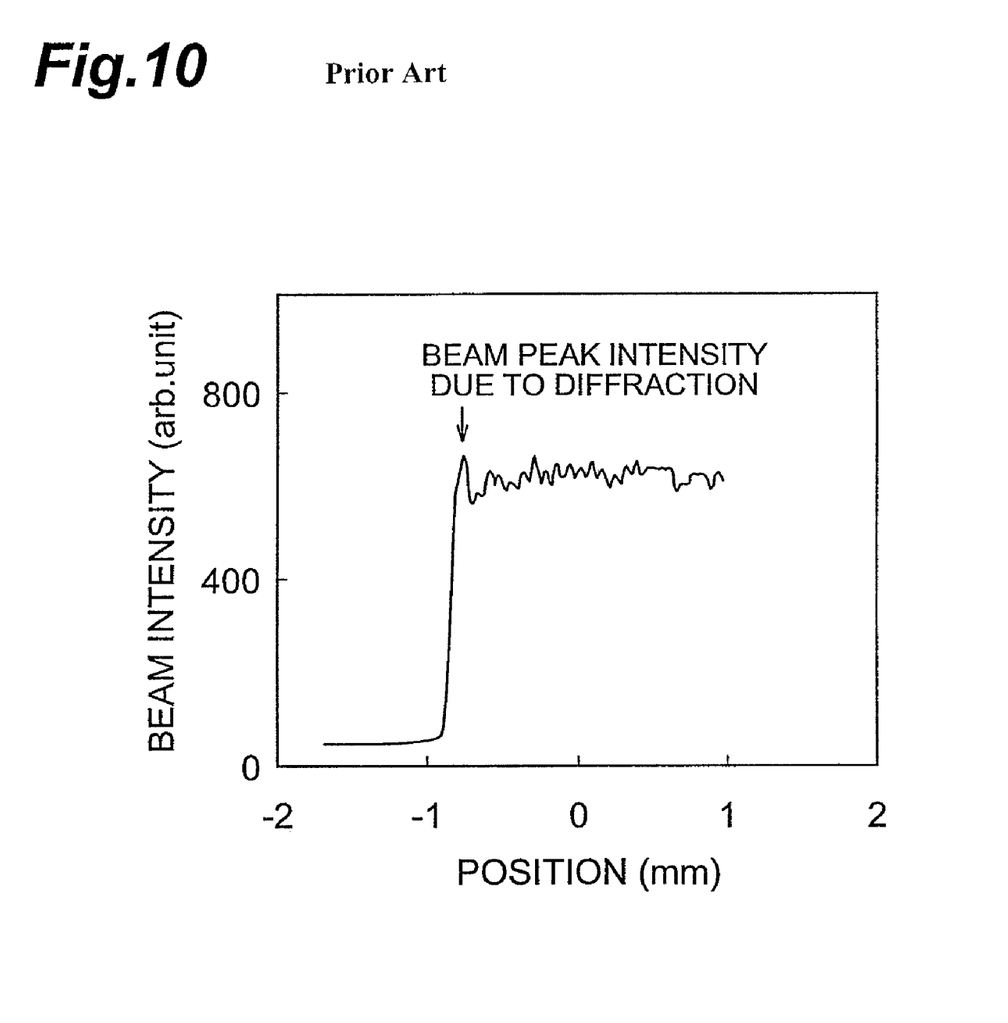
FIG. 10 is a graph showing a spatial distribution of the beam intensity shaped by the hard aperture mask shown in FIG. 9.

In the spatial distribution of the beam intensity shaped by the hard aperture mask 80, as shown in FIG. 10, a peak of the beam intensity appeared due to the diffraction with the edge defining the aperture. Here, a confocal optical system is constructed by two lenses, and a pinhole of 1 mm in diameter is placed at the position of the focal point. Then, a He—Ne laser beam is irradiated to the aperture of the hard aperture mask, the beam passing through the aperture is Fourier-transformed by a first lens, a high spatial frequency components removed by the pinhole arranged on this Fourier transforming surface, and the beam passing through this pinhole is Fourier-transformed again by a second lens, whereby a spatial distribution of the beam on this Fourier transformed surface is determined. Note that the shaped spatial distribution of the beam intensity, as shown hereinafter, is determined in a similar manner.

For example, in the MOPA laser apparatus, when the laser beam having a peak intensity is amplified in such a spatial distribution, the peak of the beam intensity is further enlarged after the amplification. Then, the peak of this beam intensity may cause the damage to optical components.

Figure 11:
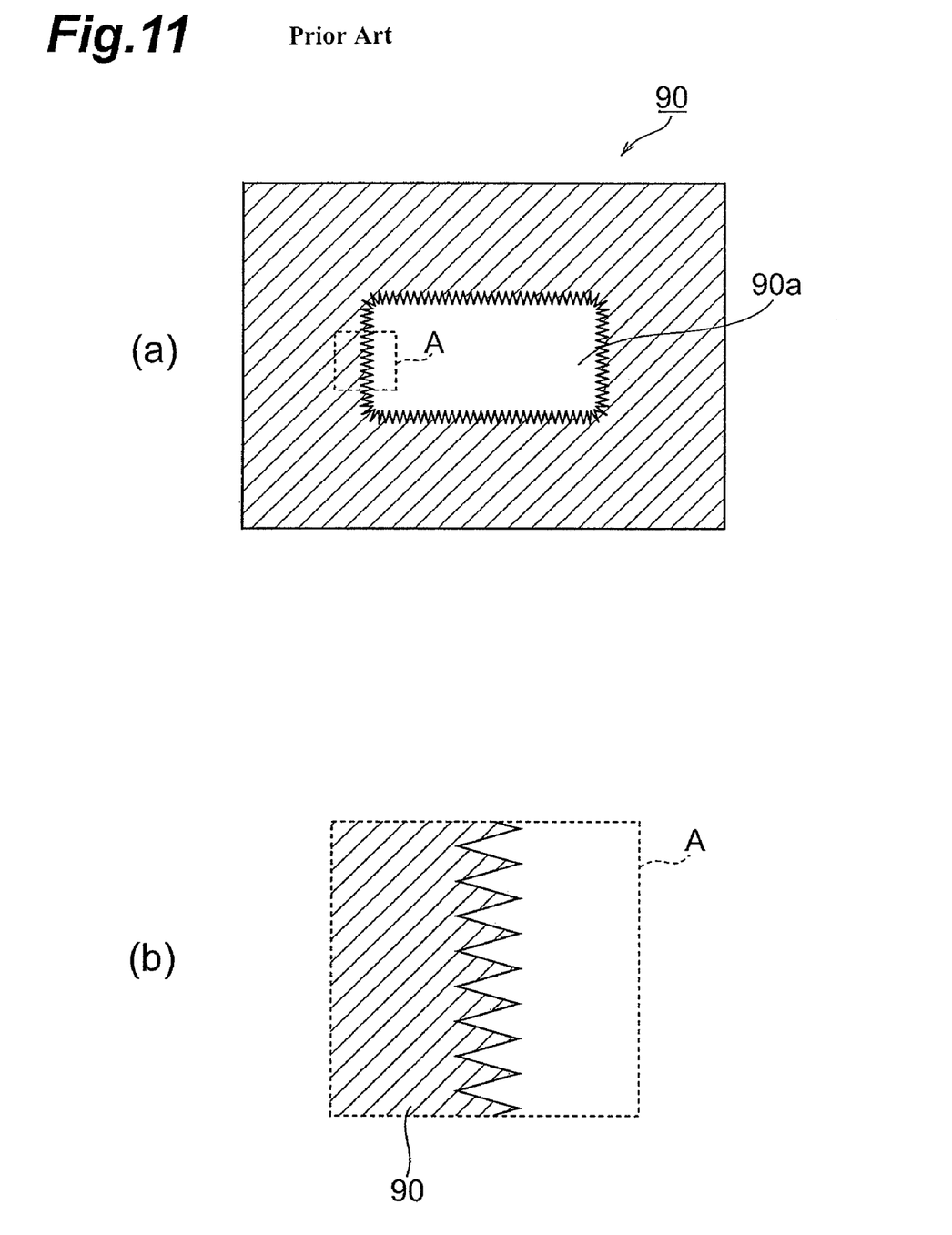
FIG. 11 is a view for explaining a structure of a serrated aperture mask.

Thus, as an optical mask capable of reducing the peak of the beam intensity due to the diffraction as mentioned above, a serrated aperture mask is known as shown in Y. Kitagawa et al., "Prepulse-free Petawatt Laser for Fast Ignitor", Annual Progress Report 2002, Institute of Laser Engineering, Osaka University, pp. 12-21 (2002). The area (a) in FIG. 11 shows a whole view of the serrated mask, and the area (b) in FIG. 11 shows an enlarged view of section A. A serrated aperture mask 90 includes an aperture 90a having the same schematic shape as the spatial distribution of a beam intensity after a desired shaping, and a fringe defining the aperture 90a is formed in a serrated shape.

SUMMARY OF THE INVENTION

The inventors have studied above-mentioned prior art in detail, and as a result, have found problems as follows.

Figure 12:
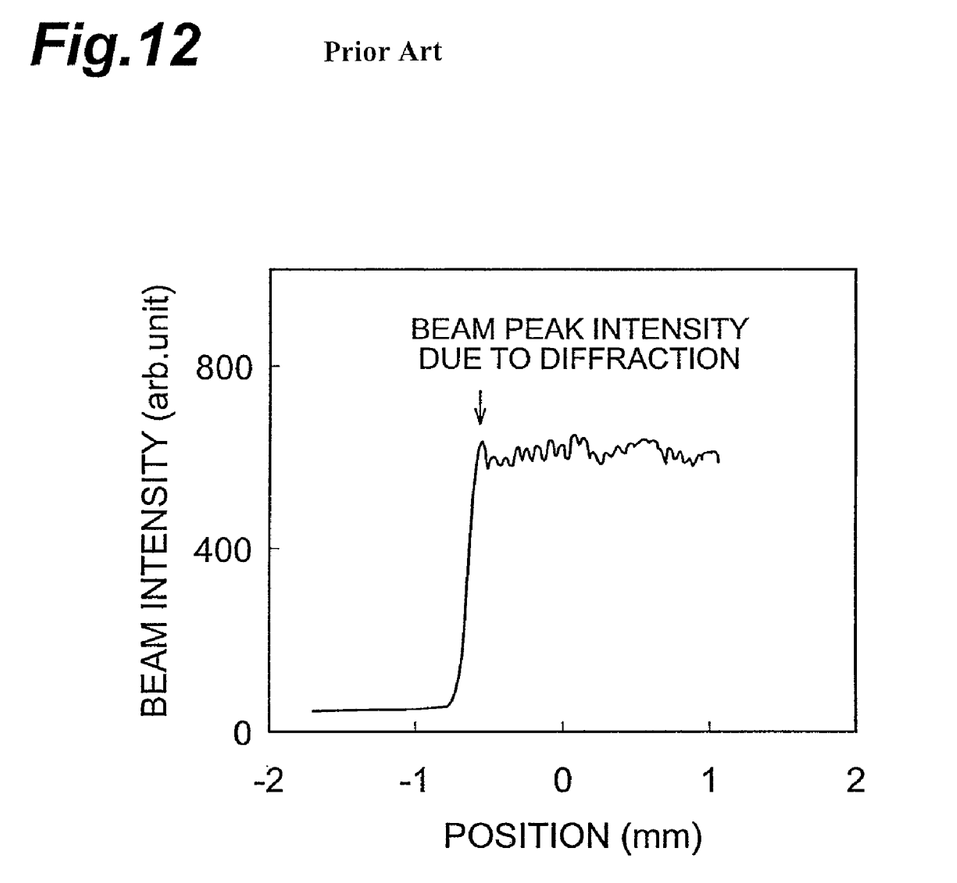
FIG. 12 is a graph showing a spatial distribution of the beam intensity shaped by the serrated aperture mask shown in FIG. 11.

That is, in the spatial distribution of the beam intensity shaped by the serrated aperture mask, as shown in FIG. 12, a peak of the beam intensity due to diffraction still appears though the peak of the beam intensity tends to be smaller as compared with that of the hard aperture mask. Here, the pitch of the serrations in the serrated shape of the fringe defining the aperture was 0.2 mm, and the height of the serrations was 0.6 mm. The reason that the peak of the beam intensity due to diffraction appears in the case of the serrated aperture mask as well is as follows.

Figure 13:
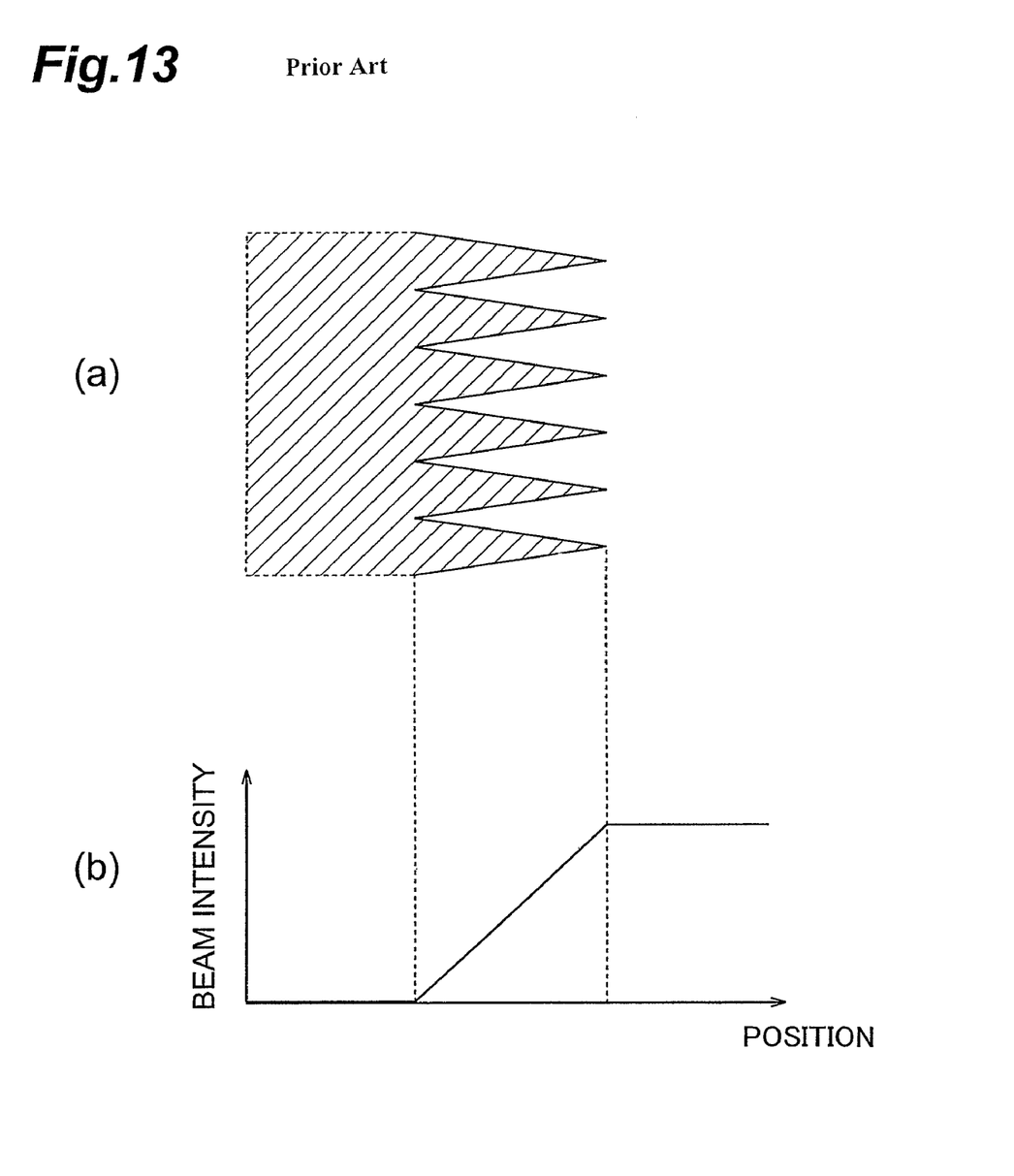
FIG. 13 is an illustration for explaining a first structure of a serrated mask of which the fringe defining an aperture has an ideal serrated shape.

Namely, in the serrated shape of the fringe defining the aperture of the serrated aperture mask, the portion of the fringe between the peak and the valley of each serration is ideally linear, as shown in the area (a) of FIG. 13. Therefore, assuming there is no diffraction, the spatial distribution of a transmitted beam is changed constantly gently, as shown in the area (b) of FIG. 13.

Figure 14:
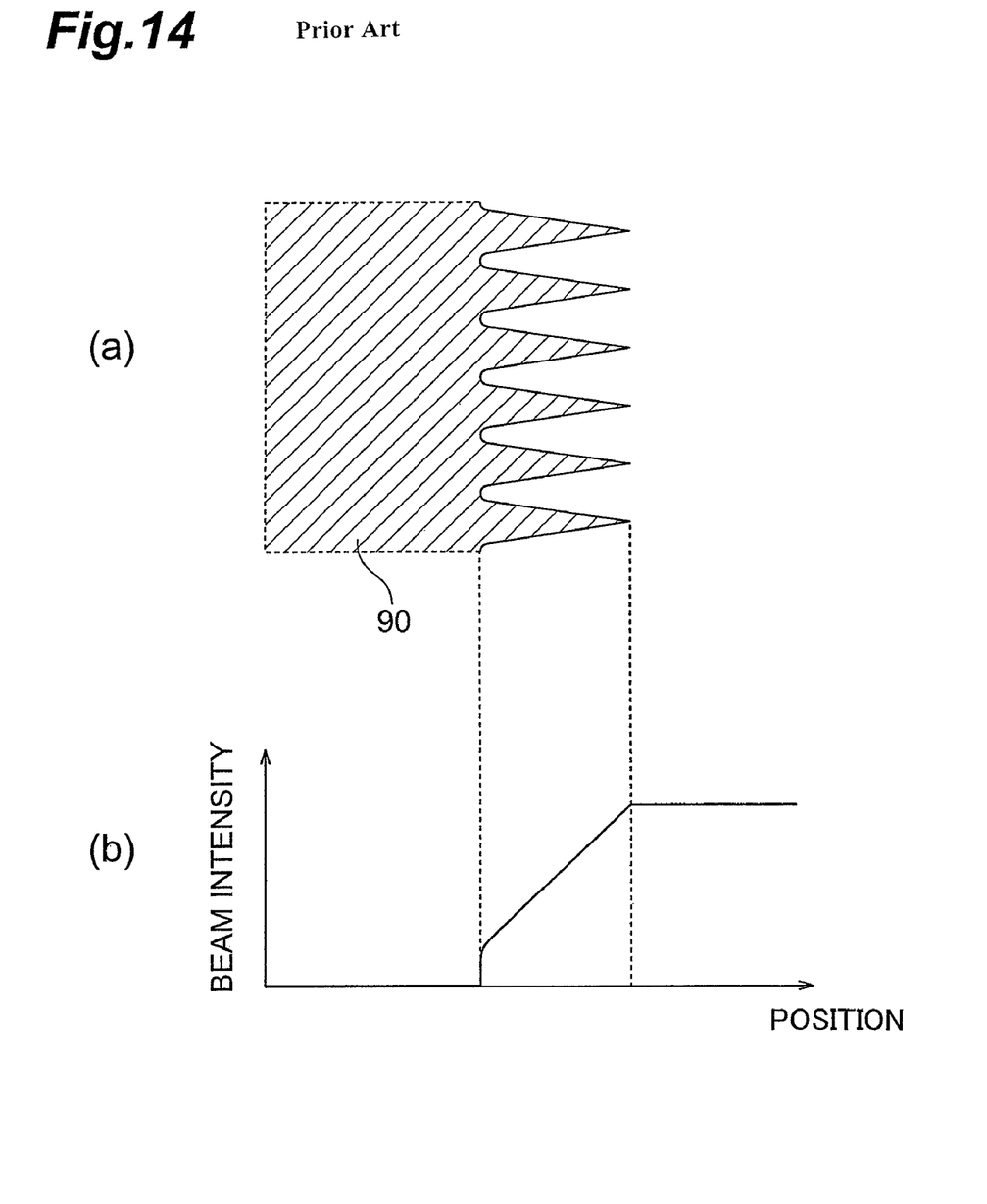
FIG. 14 is an illustration for explaining a second structure of a serrated mask of which the fringe defining an aperture has an actual serrated shape.

In contrast, the serrated shape of the fringe defining the aperture of the serrated aperture mask is actually in a circular-arc shape at the valley portion of each serration, as shown in the area (a) of FIG. 14. Therefore, as shown in the area (b) of FIG. 14, the spatial distribution of a transmitted beam changes rapidly in a certain portion. This is because in a case where the fringe defining the aperture of the serrated aperture is machined in the serrate shape, when laser machining or electrical discharge machining is employed, there is a limit of the focused diameter of a laser beam or the diameter of a discharge wire; accordingly, as shown in the area (a) of FIG. 14, the fringe will be formed in a circular-arc form at the valley portion of each serration in conformity with that diameter. And, in view of this fact, even in the spatial distribution of the beam intensity shaped by the serrated aperture mask, as shown in FIG. 12, a peak of beam intensity due to diffraction still appears.

Incidentally, as another producing method of the serrated aperture mask, there is also a method that forms a chrome film, and then obtains a desired serrated shape at the fringe defining the aperture by etching. According to this etching, it is possible to approximate the serrated shape of the fringe defining the aperture of the serrated aperture mask to an ideal shape. But, a mask material for etching is necessary, and there are many steps since it is necessary to form an anti-reflection film so as to reduce the reflection from the glass substrate, resulting in a high manufacturing cost by etching as compared with the laser machining or electrical discharge machining.

The present invention is made to overcome the above-mentioned problems, and it is an object to provide a low-cost optical mask capable of reducing further the peak of beam intensity due to diffraction.

An optical mask according to the present invention includes: a first mask having a fringe, at least part of which is formed in a serrated shape; and a second mask having a fringe, at least part of which is formed in a serrated shape. Particularly, in the optical mask according to the present invention, the first mask and the second mask are overlapped such that the schematic shapes of the respective fringes formed in the serrated shape are identical or equal with each other, and that the serrations in the serrated shape of the respective fringes are arranged alternately. In accordance with the present invention, even when the serrated shapes of the respective fringes of the first mask and second mask are in a circular-arc form, in the serrated shape of the fringe of the optical mask, the portion between the peak and the valley of each serration becomes linear, resulting in approximating an ideal shape. The peak of beam intensity due to diffraction is reduced in the spatial distribution of the beam intensity shaped by this optical mask. And, even when the beam outputted from this optical mask is amplified by an laser amplifier, the peak of the beam intensity after the amplification is small, thereby reducing the damage to be caused to the optical components. Meanwhile, since the first mask and second mask may be produced by laser machining or electrical discharge machining, the optical mask can be produced at low cost.

In the optical mask according to the present invention, it is preferred that the pitch of the serrations in the serrated shape at the respective fringes of the first mask and second mask are equal to each other at a constant value. It is preferred that the fringes formed in the serrated shape of the first mask and second mask each are the one defining an aperture. Furthermore, the optical mask according to the present invention further includes a third mask having a fringe, at least part of which is formed in a serrated shape, and the first mask, second mask, and third mask are overlapped such that the schematic shapes of the respective fringes formed in the serrated shape are identical with each other, and that the serrations in the serrated shape of the respective fringes appear in order.

An MOPA laser apparatus according to the present invention is characterized by including: (1) a beam source outputting beam; (2) the aforementioned optical mask (an optical mask according to the present invention) inputting the beam outputted from the beam source, shaping a spatial distribution of the beam, and outputting the resultant beam; and (3) an laser amplifier for amplifying the beam outputted from the optical mask. In this MOPA laser apparatus, the beam outputted from the beam source is amplified by the laser amplifier after the spatial pattern is formed by the optical mask. Since the optical mask employed herein is an optical mask according to the present invention, the peak of the beam intensity due to diffraction is reduced in the spatial distribution of the beam intensity outputted form a spatial mask and inputted to the laser amplifier. Therefore, even when the beam outputted from this optical mask is amplified, the peak of the beam intensity after the amplification is small, thereby reducing the damage to be caused to the optical components.

The present invention will be more fully understood from the detailed description given herein below and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the following, embodiments of an optical mask and an MOPA laser apparatus including the same according to the present invention will be explained in detail with reference to FIGS. 1 to 8. In the explanation of the drawings, constituents identical to each other will be referred to with numerals identical to each other without repeating their overlapping descriptions.

Figure 1:
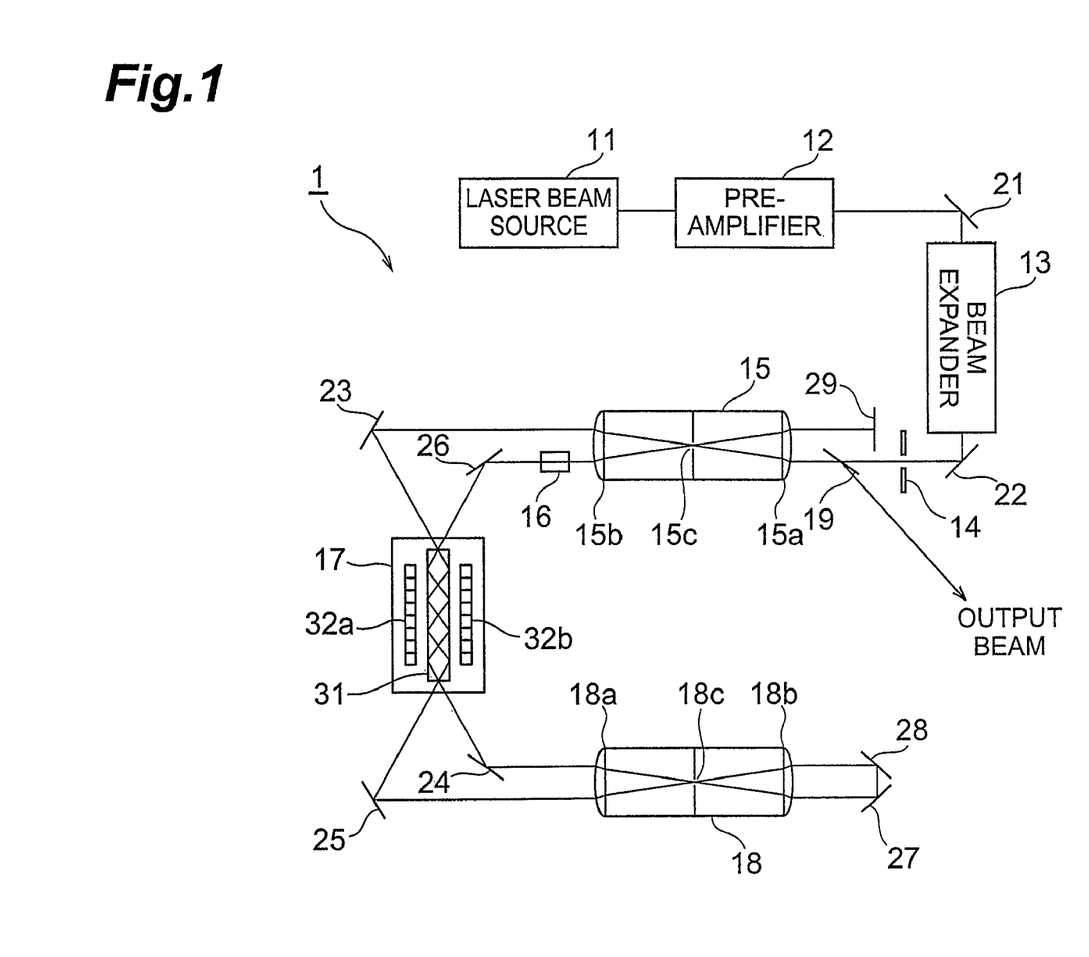
FIG. 1 is a diagram showing a configuration of an embodiment of an MOPA laser apparatus according to the present invention.

An MOPA laser apparatus 1 according to the present embodiment will be first described. FIG. 1 is a diagram showing a configuration of an embodiment of the MOPA laser apparatus according to the present invention. The MOPA laser apparatus 1 shown in this figure includes a laser beam source 11, a pre-amplifier 12, a beam expander 13, an optical mask 14, a spatial filter 15, a Faraday rotator 16, an laser amplifier 17, a spatial filter 18, and a polarizer 9.

The laser beam source 11 outputs a laser beam. The wavelength of the beam outputted from the laser beam source 11 is the one that may be amplified in each of the pre-amplifier 12 and laser amplifier 17. The pre-amplifier 12 amplifies the beam outputted from the laser beam source 11. The beam expander 13 inputs the beam outputted from the pre-amplifier 12 and then reflected from a mirror 21 to enlarge the beam diameter of the beam. The optical mask 14 has an aperture, inputs the beam outputted from the beam expander 13 and reflected from a mirror 22 to transmit the beam through only the aperture. Then, the spatial pattern is shaped in a rectangular.

The spatial filter 15 has a lens 15*a*, a lens 15*b*, and a pinhole 15*c*. Meanwhile the spatial filter 18 also has a lens 18*a*, a lens 18*b*, and a pinhole 18*c*. The lens 15*a* and lens 15*b* construct a confocal system of a Keplerian telescope, and the lens 18*a* and lens 18*b* also construct a confocal system of the Keplerian telescope. These transmit the image of beam cross-sections at the optical mask 14 consecutively.

The pinhole 15*c* is arranged at a focal position between the lens 15*a* and lens 15*b*, while the pinhole is arranged at a focal position between the lens 18*a* and lens 18*b*. These pinholes 15*c*, 18*c* are provided to remove high spatial frequency components. In addition, since the pinhole 15*c* and pinhole 18*c* each are provided at a focusing position, it is desirable to be made up of a material having a large thermal shock resistance and a high hardness; it is preferred to be made up of ceramics; specifically, it is preferred to be made up of alumina, silicon nitride, carbon nitride, or boron nitride, or these mixtures, etc.

Here, it is preferred that the aperture shapes of the pinhole 15c and pinhole 18c each are substantially similar to the shape where the aperture shape of the optical mask 14 is Fourier-transformed.

The laser amplifier 17 includes a solid-state laser medium 31, a pumping beam source 32a and a pumping beam source 32b. The pumping beam source 32a and pumping beam source 32b outputting pumping beams to be irradiated to the solid-state laser medium 31 preferably include a laser diode array or a laser diode array stack. The solid-state laser medium 31 made up of a slab-shaped glass can radiate light with some wavelength by stimulated emission when the pumping beam is irradiated. The beam to be amplified is slantingly incident on the end surface of the solid-state laser medium 31, and travels in the solid-state laser medium 31 with a zigzag optical path while reflected repeatedly at the side of the solid-state laser medium 31. This laser amplifier 17 amplifies the beam inputted from the mirror 23 to the first end surface of the solid-state laser medium 31, and the amplified beam is outputted from the second end surface to the mirror 24. In addition, the laser amplifier 17 amplifies the beam inputted from the mirror 24 to the second end surface of the solid-state laser medium 31 in the solid-state laser medium 31, and the amplified beam outputs from the first end surface thereof to the mirror 25. A anti-reflection film is formed at each of the first end surface and second end surface of the solid-state laser medium 31.

The Faraday rotator 16 is provided on the optical path located between the spatial filter 15 and the mirror 26, rotates the polarization orientation of incident beam with 90 degrees by two passage of the beam, and compensates for thermal birefringence. The polarizer 19 reflects selectively a s-polarized beam outputted from the spatial filter 15, and the reflected beam is determined an outputted beam of the MOPA laser apparatus 1.

The MOPA laser apparatus 1 operates as follows. The beam outputted from the laser beam source 11 is amplified by the pre-amplifier 12, and the beam diameter thereof is enlarged by the beam expander 13 to be inputted to the optical mask 14. The beam of which the beam cross section is rendered in rectangular by the optical mask 14 passes through the spatial filter 15, mirror 23, laser amplifier 17, mirror 24, spatial filter 18 mirror 27, mirror 28, spatial filter 18, mirror 25, laser amplifier 17, mirror 26, Faraday rotator 16, and spatial filter 15 in this order, to reach the mirror 29. When the optical path from the optical mask 14 to the mirror 29 is defined by an outgoing path, the beam reaching to the mirror 29 to be reflected reaches the polarizer 19 by way of a return path is the same optical path as the outgoing path.

Since the beam passes through the Faraday rotator 16 twice between the above outgoing path (the optical path reaching from the optical mask 14 to the mirror 29) and return path (the optical path reaching from the mirror 29 to the polarizer 19), the polarization orientation of the beam rotates by 90 degrees in total. Thus, the beam reaching to the polarizer 19 by the return path is reflected by the polarizer 19, and this reflected beam becomes the outputted beam from the MOPA laser apparatus 1.

Meanwhile, with respect to the beam cross section of the beam at the position of the optical mask 14, eight image relays are carried out between the outgoing path and the return path by the spatial filter 15 or the spatial filter 18, and high spatial frequency components due to thermal distortions and so on are removed. Consequently, diffraction is reduced in the MOPA laser apparatus 1. The beam passes through the laser amplifier 17 between the outgoing path and the return path by four times and the beam is amplified in the laser amplifier 17 every that passing.

One example of more specific constructions of the MOPA laser apparatus 1 is as follows. The laser beam source 11 includes a single longitudinal/transverse seed laser beam source that pumps Nd:YLF by a laser diode, and a Q-switch laser amplifier that pumps Nd:YLF by the laser diode, and is feedback-controlled by an algorithm that a rise up time of an output pulse beam having a wavelength of 1053 nm is set to the minimum, thereby intending stability at a single mode. The pre-amplifier 12 pumps Nd:YLF laser rod by a laser diode. The solid-state laser medium 31 included in the laser amplifier 17 is a slab-shaped Nd doped glass and the two end surfaces in the longitudinal direction becomes an input/output surface for an amplified beam. The pumping beam source 32a and the pumping beam source 32b each include a laser diode array stack. The total energy of the pumping beam irradiated to the solid-state laser medium is 48 J, and the pumping efficiency is 0.5. At this time, the energy of the beam outputted from the polarizer 19 is 10 J.

Figure 2:
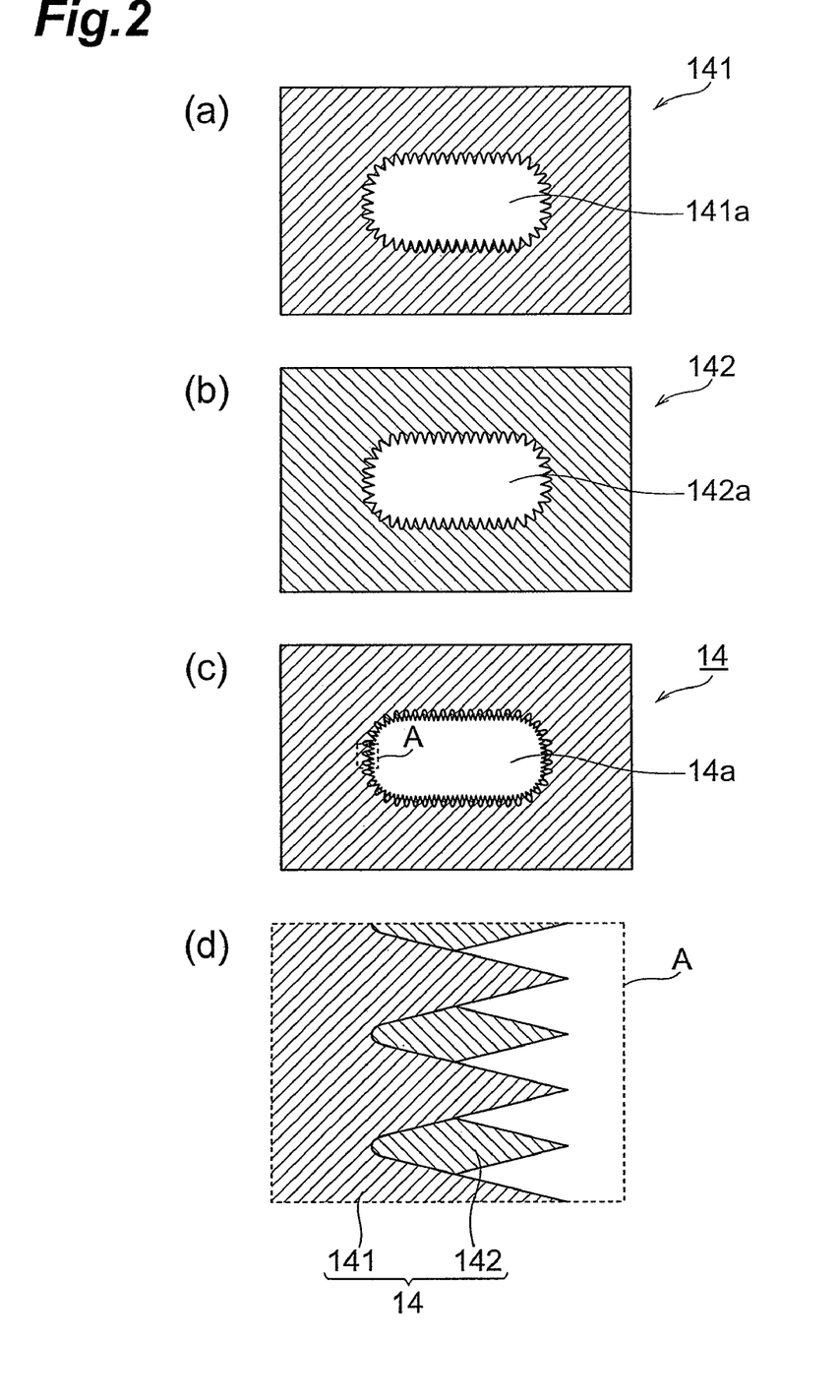
FIG. 2 is a view for explaining a structure of an embodiment of an optical mask according to the present invention.

The optical mask 14 according to the present embodiment will be described in detail. FIG. 2 is a view for explaining the structure of one embodiment of an optical mask according to the present invention. In this figures, the optical mask 14 is seen in the beam traveling direction. The area (a) and area (b) in FIG. 2 show two masks 141, 142 composing the optical mask 14, respectively. The area (c) in FIG. 2 shows the whole figure of the optical mask 14. The area (d) in FIG. 2 shows an enlarged view of part A in the optical mask 14.

In the optical mask 14, the first mask 141 and the second mask 142 are overlapped each other. The first mask 141 and the second mask 142 each are a serrated aperture mask. The schematic figures of the aperture 141a of the first mask 141 and the aperture 142a of the second mask 142 are substantially rectangular and are equal to each other. The fringe defining the aperture 141a of the first mask 141 is formed in a serrated shape, and the fringe defining the aperture 142a of the second mask 142 also is formed in a serrated shape. The serration pitches in the serrated shape of these fringes are equal to each other at a given value. The serration arrangements in the serrated shape of these fringes are shifted by half of the pitch.

In the optical mask 14, the first mask 141 and the second mask 142 are overlapped each other so that the serrations in the serrated shape of the fringes defining the aperture 141a of the first mask 141 and the aperture 142a of the second mask 142 respectively are arranged alternately. The serration pitch in the serrated shape of the fringe defining this aperture 14a is half the one in the serrated shape of the fringes defining the apertures 141a, 142a.

As shown in the area (d) of FIG. 2, in the serrated shape of the fringes defining the respective apertures of the first mask 141 and the second mask 142, even when the valley portion of each serration is formed in a circular-arc form, the serrated shape of the fringe defining the aperture 14a of the optical mask 14 approximates an ideal shape since the edge portion between the peak and the valley of each serration is linear.

Figure 3:
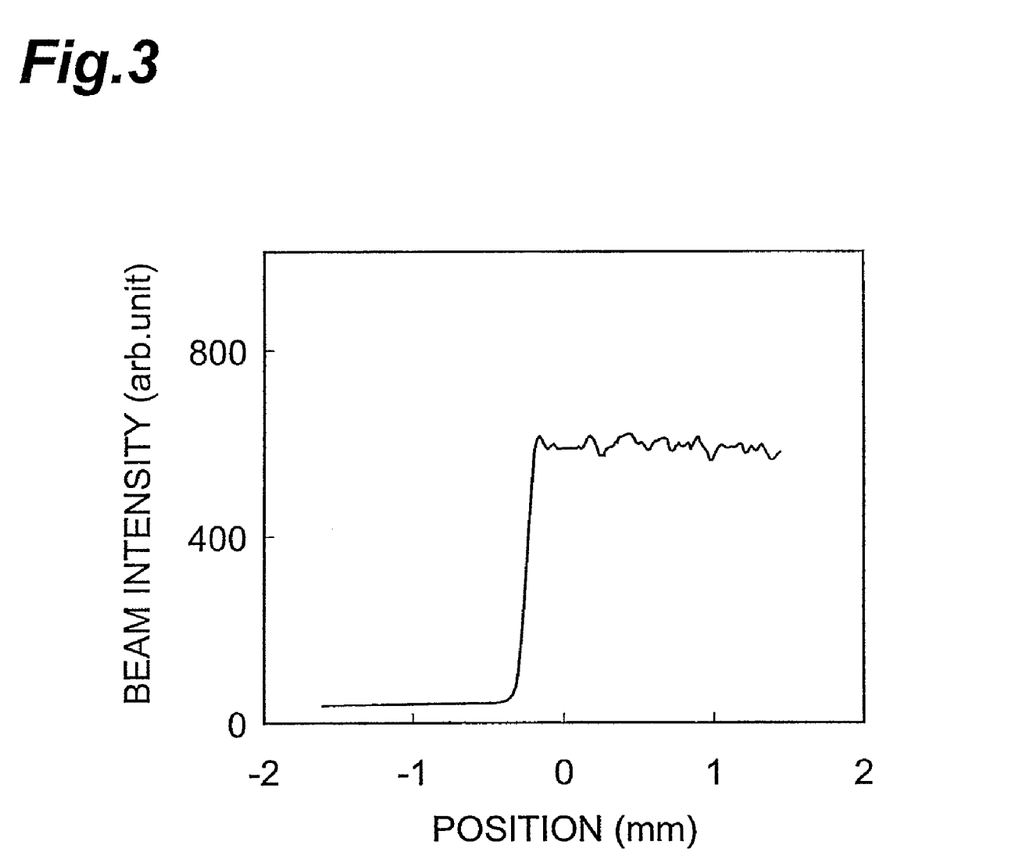
FIG. 3 is a graph showing a spatial distribution of the beam intensity shaped by an optical mask shown in FIG. 2.

FIG. 3 is a graph showing a spatial distribution of the beam intensity shaped by the optical mask 14 shown in FIG. 2. Here, in the first mask 141 and the second mask 142, the serration pitch in the serrated shape of the fringes defining the aperture thereof was 0.4 mm, and the height of the serration was 1.2 mm on design. In the optical mask 14, the serration pitch in the serrated shape of the fringe defining the aperture was 0.2 mm, and the height of the serration was 0.6 mm. As shown in this figure, in the spatial distribution shaped by the optical mask 14 according to this embodiment, the peak of the optical intensity due to diffraction is reduced. And, when the aforementioned optical mask 14 is employed in the MOPA laser apparatus 1, even if the beam outputted from the optical mask 14 is amplified by the laser amplifier 17, the peak of the optical intensity is kept smaller after the amplification, thereby reducing the damage to be suffered to optical components. In addition, since the first mask 141 and the second mask 142 may be produced by laser machining or electrical discharge machining, the optical mask can be produced at low cost.

Modifications of the optical mask according to the present invention will be next described with reference to FIGS. 4-8.

Figure 4:
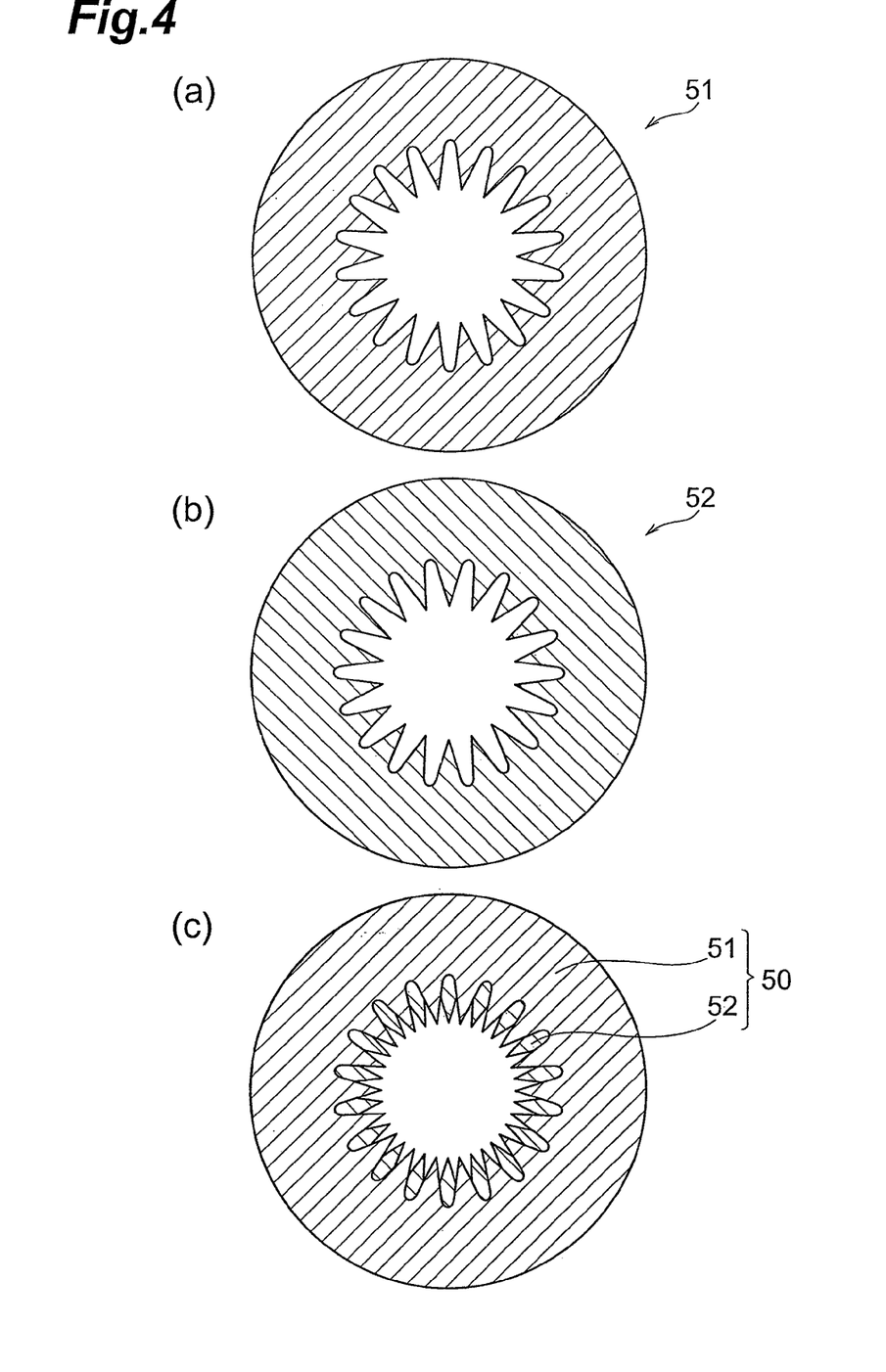
FIG. 4 is a view for explaining a structure of a first modification of the optical mask according to the present invention.
Figure 5:
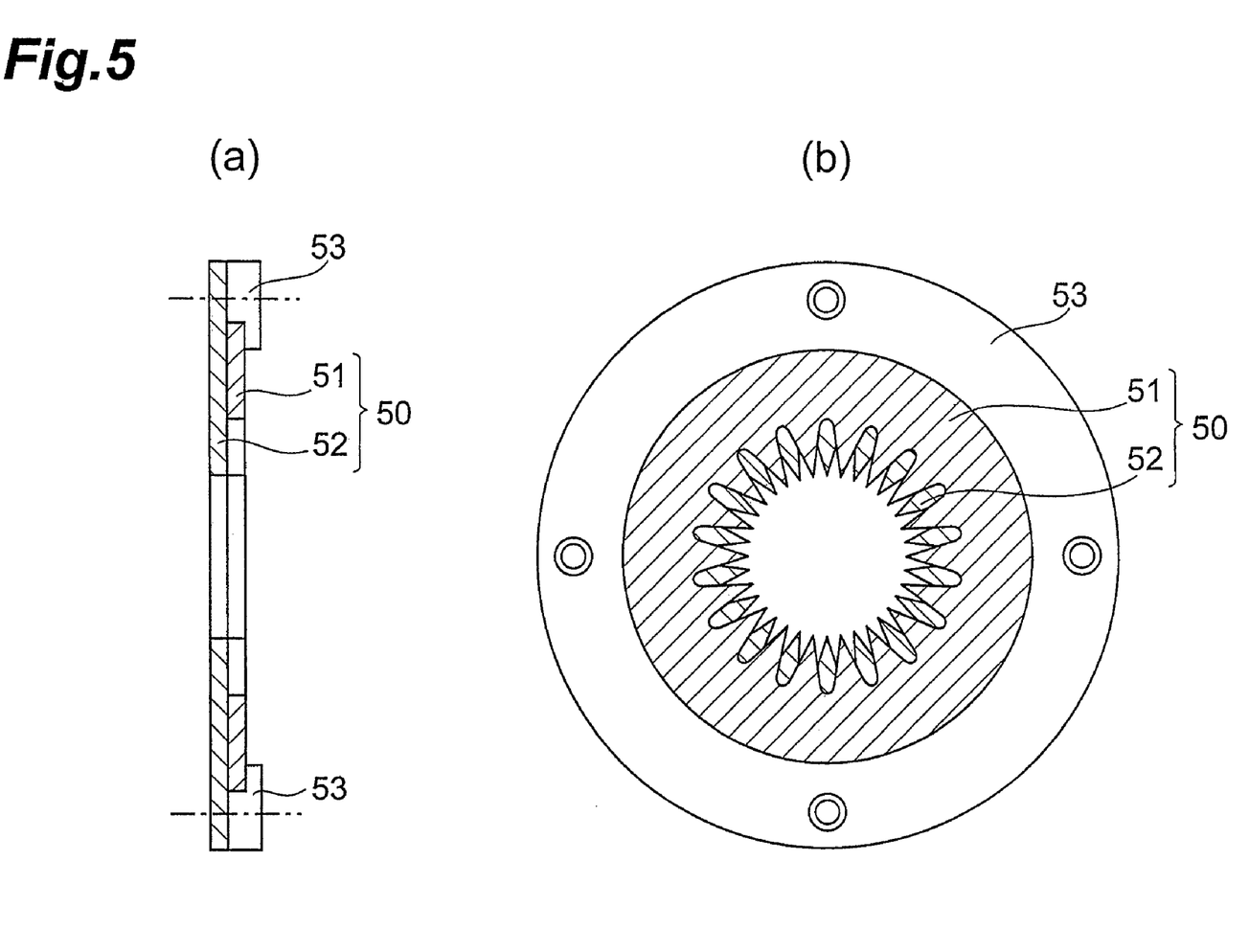
FIG. 5 is an assembly process view of the optical mask shown in FIG. 4.

FIG. 4 is a view for explaining the structure of an optical mask 50 of a first modification. This figure also is a view as the optical mask 50 is seen in the beam-traveling direction. The area (a) in FIG. 4 shows one mask 51 constituting the optical mask 50, and the area (b) in FIG. 4 shows the other mask 52 constituting the optical mask 50. The area (c) in FIG. 4 shows the whole view of the optical mask 50. Then, FIG. 5 is an assembly process view of the optical mask 50 of the first modification. The area (a) in FIG. 5 is a side-sectional view of the mask 50, and the area (b) in FIG. 5 is a front view thereof.

In this optical mask 50, the first mask 51 and the second mask 52 are overlapped each other. The first mask 51 and the second mask 52 each are a serrated aperture mask. The schematic shapes of the respective apertures of the first mask 51 and the second mask 52 is circular, and identical to each other. The fringes defining the respective apertures of the first mask 51 and the second mask 52 have serrated shapes identical to each other, and the serration pitches in the serrated shapes are equal to each other with a constant value.

In the optical mask 50, the first mask 50 and the second mask 52 are overlapped each other so that the serrations in the serrated shape of the fringes defining the respective apertures of the first mask 51 and the second mask 52 are formed alternately, Thus, the fringe defining the aperture of the optical mask 50 also is in a serrated shape. In the serrated shape of the fringes defining the respective apertures of the first mask 51 and the second mask 52, even when the valley portion of each serration is formed in a circular-arc shape, the serrated shape of the fringe defining the aperture of the optical mask 50 approximates an ideal shape since the edge portion between the peak and the valley of each serration is linear.

Further, as shown in FIG. 5, the mask 51 can rotate and displace in parallel to the mask 52, and is fixed with respect to the mask 52 by a fixing member 53. In such a way, the optical mask 50 can be easily assembled.

Figure 6:
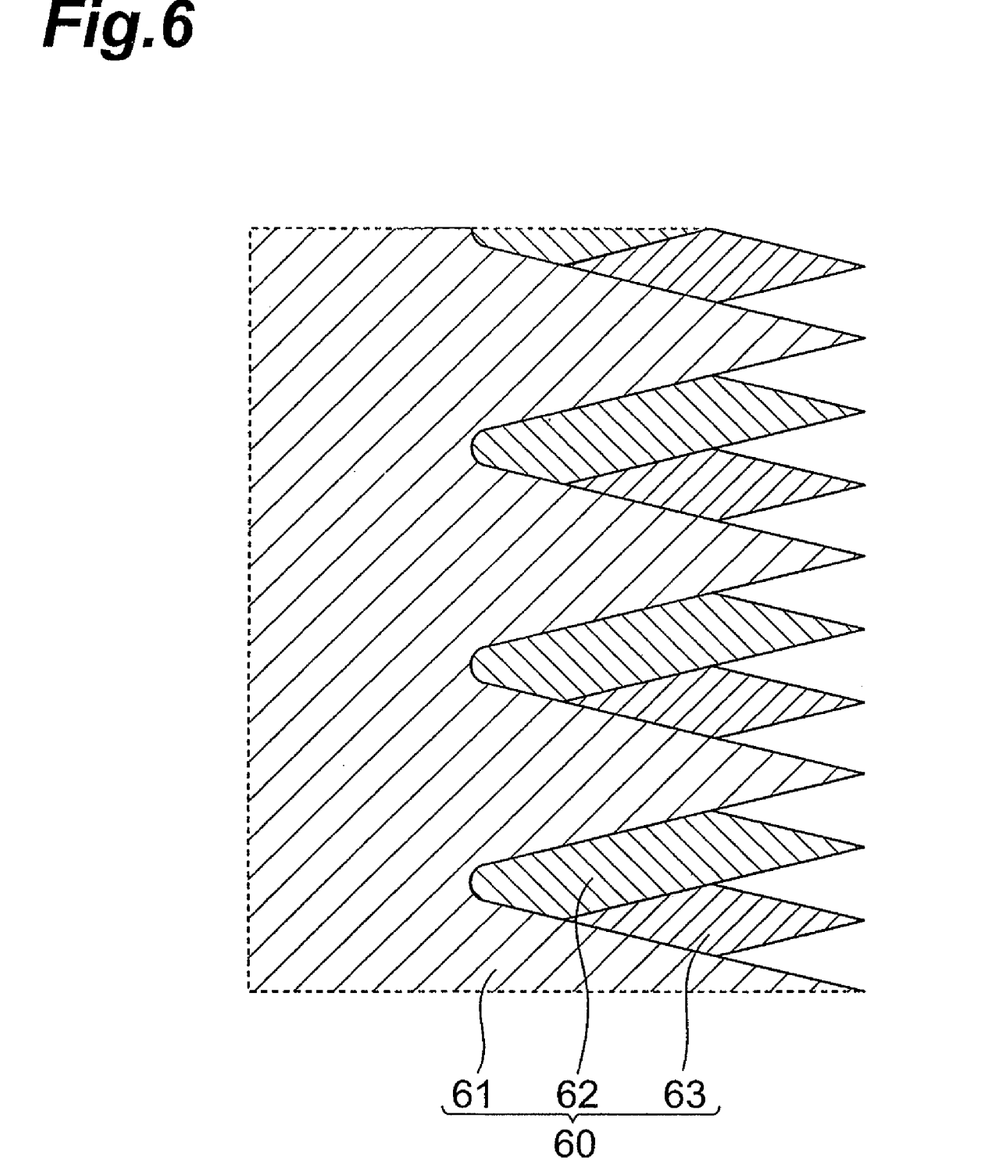
FIG. 6 is a view for explaining a structure of a second modification of the optical mask according to the present invention.

FIG. 6 is a view for explaining the structure of an optical mask of a second modification. This figure is a view where the optical mask 50 is seen in the beam-traveling direction, and part of the fringe defining the aperture is enlarged. The optical mask 60 is formed such that a first mask 61, a second mask 62, and a third mask 63 are overlapped one another. The first mask 61, second mask 62 and third mask 63 each are a serrated aperture mask. The schematic shapes of the respective apertures of the first mask 61, second mask 62, and third mask 63 are circular, and equal to each other. The fringes defining the respective apertures of the first mask 61, second mask 62, and third mask 63 have a serrated shape identical to each other, and the serration pitches in the serrated shape are equal to each other at a constant value.

In the optical mask 60, the first mask 61, second mask 62, and third mask 63 are overlapped each other so that the serrations in the serrated shapes of the fringes defining the respective apertures of the first mask 61, second mask 62, and third mask 63 appear in turn. Consequently, the fringe defining this optical mask 60 has a serrated shape. In the serrated shape of the fringes defining the respective apertures of the first mask 61, second mask 62, and third mask 63, even when the valley portion of each serration is formed in a circular-arc shape, the serrated shape of the fringe defining the aperture of the optical mask 60 approximates an ideal shape since the edge portion between the peak and the valley of each serration is linear.

Meanwhile, as compared with the optical mask 50 of the first modification where the two masks are overlapped each other, the three masks are overlapped one another in the optical mask 60 of the second modification, and thereby the serrated shape defining the aperture of the optical mask 60 is finished more precisely.

Figure 7:
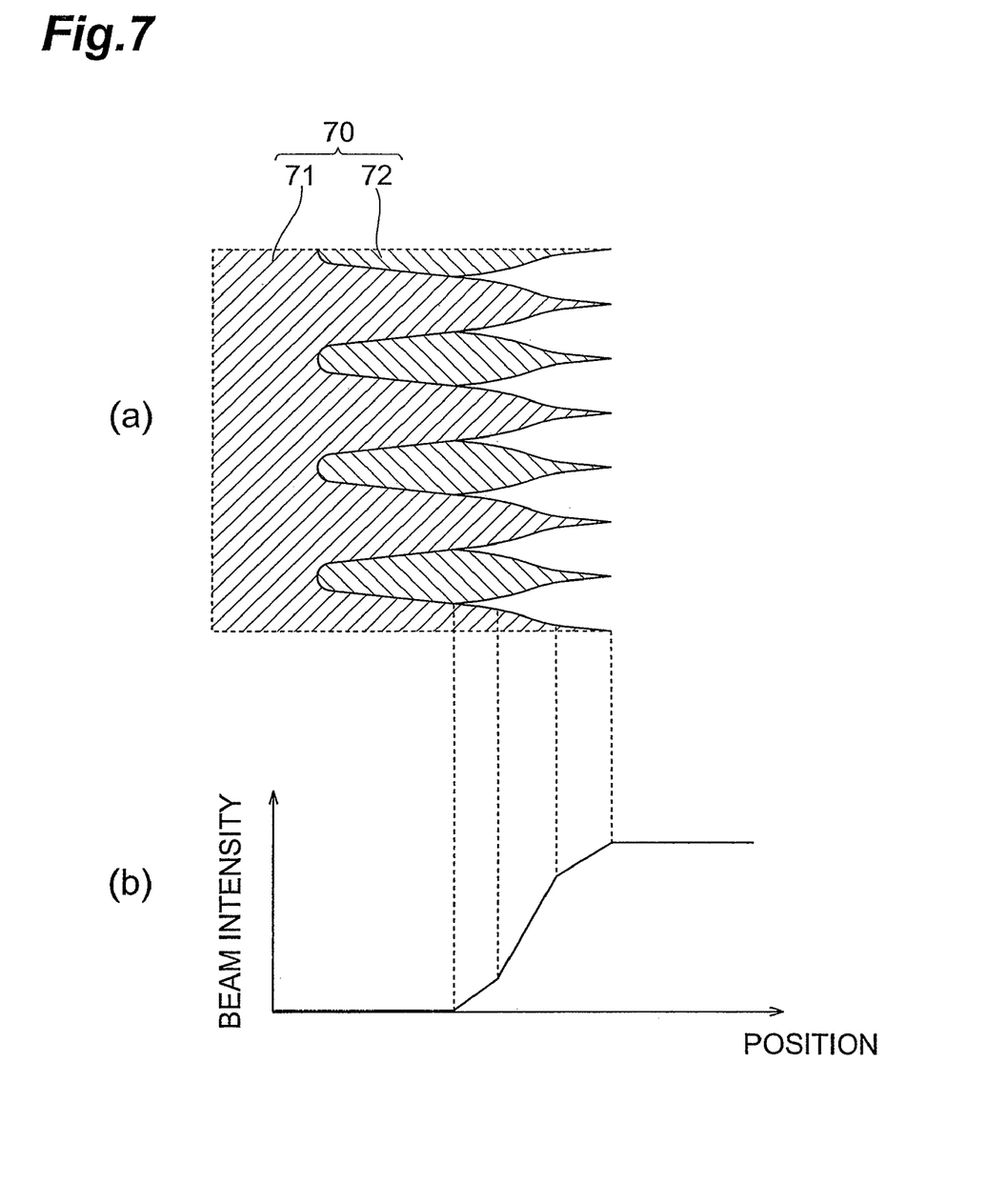
FIG. 7 is a view for explaining a structure of a third modification of the optical mask according to the present invention.

FIG. 7 is a view for explaining the structure of an optical mask 70 of a third modification. The area (a) in FIG. 7 is a view where the optical mask 70 is seen in the beam-traveling direction, and part of the fringe defining the aperture is enlarged. The area (b) in FIG. 7 is a view representing a spatial distribution of the beam intensity shaped by the optical mask 70. The optical mask 70 is formed such that a first mask 71 and a second mask 72 are overlapped each other. The first mask 71 and second mask 72 each are a serrated aperture mask. The schematic shapes of the respective apertures of the first mask 71 and second mask 72 are circular, and equal to each other. The fringes defining the respective apertures of the first mask 71 and second mask 72 have a serrated shape identical to each other, and the serration pitches in the serrated shapes are equal to each other at a constant value.

In the optical mask 70, the first mask 71 and the second mask 72 are overlapped each other so that the serrations in the 0serrated shape of the fringes defining the respective apertures of the first mask 71 and second mask 72 are formed alternately, Thus, the fringe defining the aperture of the optical mask 70 also is formed in a serrated shape. In the serrated shape of the fringes defining the respective apertures of the first mask 71 and second mask 72, even when the valley portion of each serration is formed in a circular-arc shape, the serrated shape of the fringe defining the aperture of the optical mask 70 approximates an ideal shape since the edge portion between the peak and the valley of each serration is linear.

In particular, in the optical mask 70, the height of the serration in the serrated shape changes stepwise, the rate of change of the height of the serration is small at each of the tip and bottom portions of the serration, while the rate of change of the height of the serration is large in the middle portion. Thus, the spatial distribution of a transmitted beam, as shown in the area (b) of FIG. 7, not only changes continuously gently, but also it changes especially gently at each of the tip and bottom portions of the serration. Therefore, in the spatial distribution of the beam intensity shaped by the optical mask 70, the peak due to diffraction can be further reduced.

Figure 8:
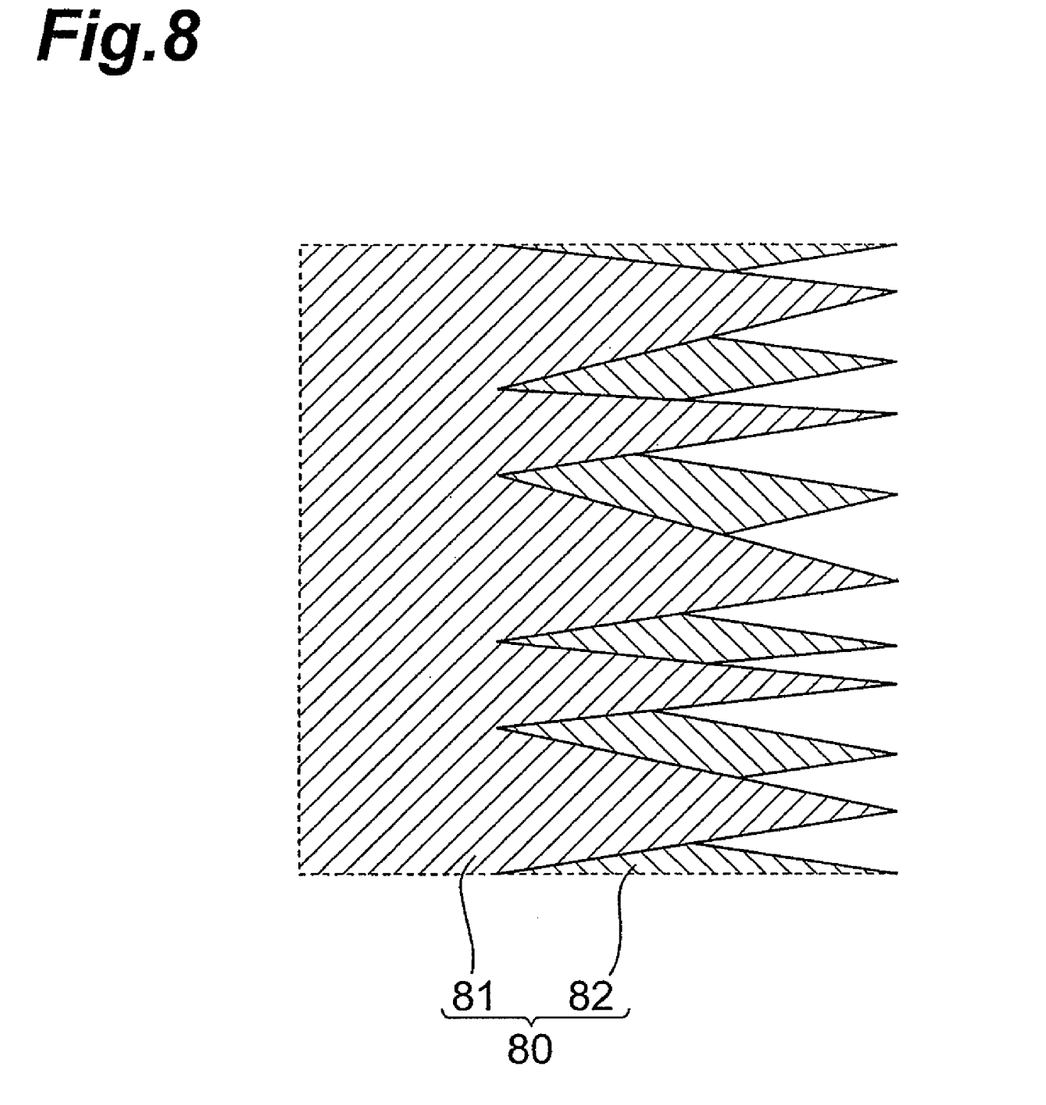
FIG. 8 is a view for explaining a structure of a fourth modification of the optical mask according to the present invention.

FIG. 8 is a view for explaining the structure of an optical mask 80 of a fourth modification. This figure is a view where the optical mask 80 is seen in the beam-traveling direction, and part of the fringe defining the aperture is enlarged. The optical mask 80 is formed such that a first mask 81 and a second mask 82 are overlapped each other. The first mask 81 and second mask 82 each are a serrated aperture mask. The schematic shapes of the respective apertures of the first mask 81 and second mask 82 are circular, and equal to each other. However, as is different from the embodiments and modifications described above, the fringes defining the respective apertures of the first mask 81 and second mask 82 do not necessarily have a serrated shape identical to each other, and also the serration pitches in the serrated shapes are not necessarily equal to each other, not having a constant value.

In the optical mask 80, the first mask 81 and the second mask 82 are overlapped each other so that the serrations in the serrated shape of the fringes defining the respective apertures of the first mask 81 and second mask 82 are formed alternately, Thus, the fringe defining the aperture of the optical mask 80 also is formed in a serrated shape. In the serrated shape of the fringes defining the respective apertures of the first mask 81 and second mask 82, even when the valley portion of each serration is formed in a circular-arc shape, the serrated shape of the fringe defining the aperture of the optical mask 80 approximates an ideal shape since the edge portion between the peak and the valley of each serration is linear.

In the present invention, various modifications are possible, not limited to the above embodiments. For example, schematic shapes of the aperture of the optical mask may be determined optionally, not limited to rectangle, circle, or the like. The optical mask may be a mask of which the whole or part of the outer fringe has a serrated shape, not limited to a mask having an aperture; in this case, a first mask and a second mask are overlapped each other to be produced when the schematic shapes of these outer fringe are identical to each other with a serrated shape.

Further, both or either of the first and second masks constituting the optical mask needn't an integratedly constructed mask, and may be divided by a plurality of parts. For example, in the optical mask 14 according to the above embodiments, the first mask 141 may be the one integratedly constructed, while the second mask 142 may be the one composed of a plurality of divided sections. In this case, the plurality of divided sections of the second mask 142 each are overlapped with the first mask 141 integratedly constructed so that the respective serrations are arranged alternately.

As described above, in the optical mask according to the present invention, the beam intensity due to diffraction can be further reduced, and produced at low cost.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical mask comprising:
    a first mask having a fringe, at least part of which is formed in a serrated shape; and
    a second mask physically separated from said first mask, said second mask having a fringe, at least part of which is formed in a serrated shape, the schematic shape of the fringe of said second mask being identical with the schematic shape of the fringe of said first mask,
    wherein said first mask and said second mask are overlapped such that the serrations at the fringe of said first mask and the serrations at the fringe of said second mask are arranged alternately.

2. A MOPA laser apparatus comprising:
    a beam source outputting beam;
    an optical mask according to claim 1 inputting the beam outputted from the beam source, shaping a spatial distribution of the beam, and outputting the resultant beam; and
    an laser amplifier for amplifying the beam outputted from said optical mask.

3. An optical mask according to claim 1, wherein the pitch of the serrations at the respective fringes of said first mask and said second mask are equal to each other at a constant value.

4. An MOPA laser apparatus comprising:
    a beam source outputting beam;
    an optical mask according to claim 3 inputting the beam outputted from the beam source, shaping a spatial distribution of the beam, and outputting the resultant beam; and
    an laser amplifier for amplifying the beam outputted from said optical mask.

5. An optical mask according to claim 1, wherein the fringes of said first mask and said second mask, which are formed in the serrated shape, define an aperture.

6. An MOPA laser apparatus comprising:
    a beam source outputting beam;
    an optical mask according to claim 5 inputting the beam outputted from the beam source, shaping a spatial distribution of the beam, and outputting the resultant beam; and
    an laser amplifier for amplifying the beam outputted from said optical mask.

7. An optical mask according to claim 1, further comprising a third mask having a fringe, at least part of which is formed in a serrated shape,
    wherein said first mask, said second mask, and said third mask are overlapped such that the schematic shapes of the respective fringes formed in the serrated shape are identical with each other, and that the serrations in the serrated shape of the respective fringes appear in order.

8. An MOPA laser apparatus comprising:
    a beam source outputting beam;
    an optical mask according to claim 7 inputting the beam outputted from the beam source, shaping a spatial distribution of the beam, and outputting the resultant beam; and
    an laser amplifier for amplifying the beam outputted from said optical mask.

* * * * *